Patented Jan. 23, 1940

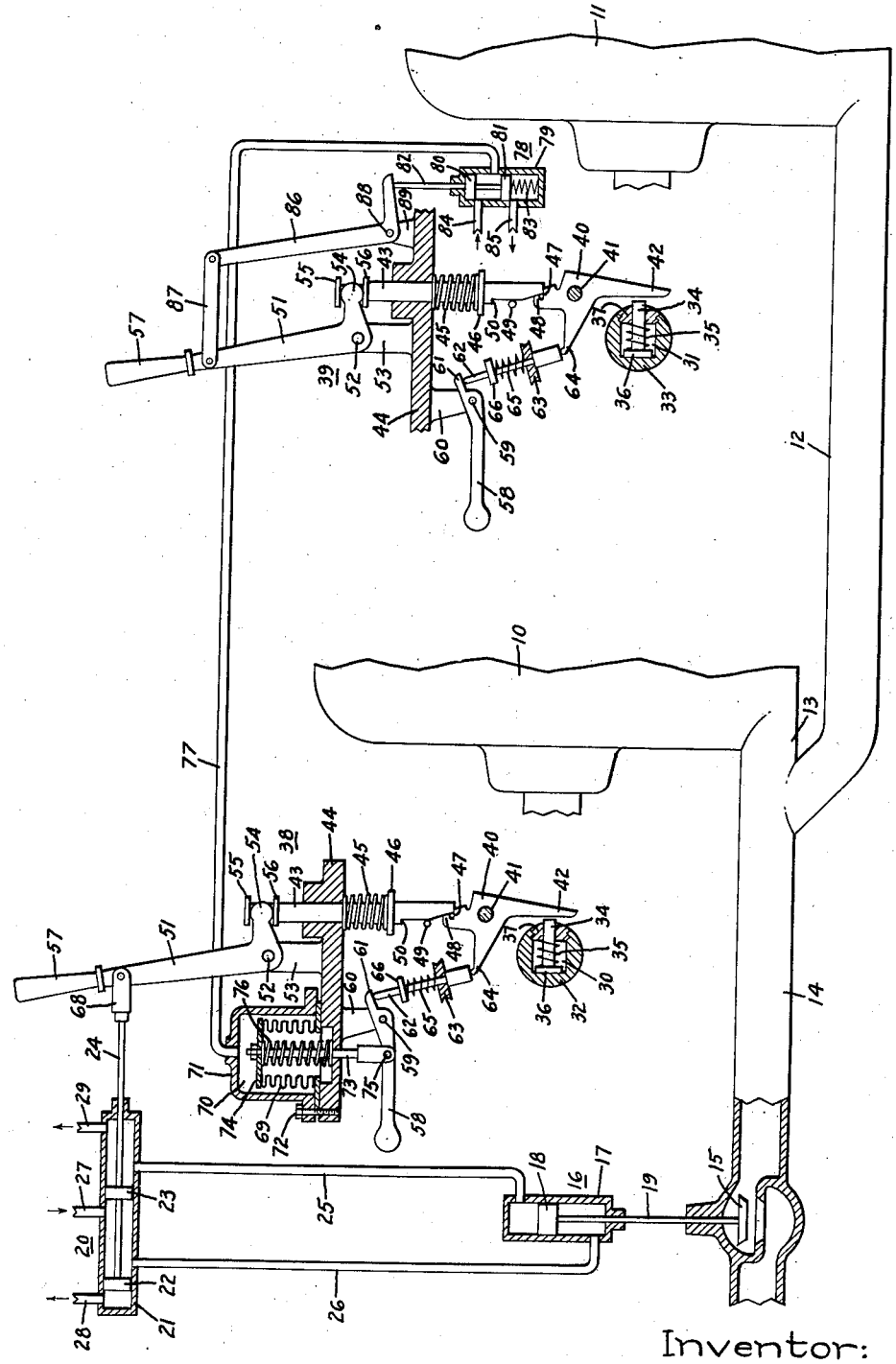

2,188,187

UNITED STATES PATENT OFFICE 2,188,187

EMERGENCY GOVERNING APPARATUS

Paul H. Knowlton, Schenectady, N. Y., assignor to General Electric Company, a corporation of New York Application May 18, 1938, Serial No. 208,587

4 Claims. (Cl. 74—2)

This invention relates to control systems for elastic fluid power plants embodying a plurality of elastic fluid turbines adapted to receive operating fluid through a common feeder conduit and more particularly to emergency governing apparatus associated with each of the plurality of turbines for controlling the flow of elastic fluid to the turbines upon an abnormal operating condition obtaining with respect to any one of said turbines.

In elastic fluid power plants it is a common practice to supply elastic fluid to a plurality of relatively small turbines through a common feeder conduit or, in the case that one or more auxiliary turbines are to be operated simultaneously with a main turbine, such auxiliary turbines are also generally supplied with elastic fluid from the the same feeder conduit as supplies the main turbine. Each turbine is generally provided with emergency governing means for shutting off the supply of elastic fluid thereto upon an abnormal condition obtaining due to failure of the load, failure of the regular throttle valve or the failure of some part of the turbine itself. In power plant installations, of the type referred to, particularly those operating with extremely high pressures, the emergency control valves in the feeder conduits are generally large, complicated and costly pieces of apparatus. Hence, it is desirable to reduce the number of such valves in power plant systems where possible.

It is an object of my invention to provide a single emergency control valve in the common feeder conduit which may in turn be operated to the closed position upon the tripping of the emergency governor apparatus associated with any one of the plurality of turbines receiving operating fluid through this conduit.

It is a further object of my invention to provide an improved emergency governor apparatus for power plants of the type specified embodying a plurality of turbines supplied in parallel whereby the control is accomplished in a simple and efficient manner.

For a consideration of what I believe to be novel and my invention, attention is directed to the following description and the claims appended thereto in connection with the accompanying drawing.

In the single figure of the drawing I have shown a power plant installation including a plurality of turbines adapted to be supplied with elastic fluid through a common feeder. The common feeder is provided with a control valve which is adapted to be actuated upon an abnormal condition of speed obtaining with respect to any one of said turbines.

Referring to the drawing, 10 and 11 are elastic fluid turbines adapted to be supplied with elastic fluid through branch feeders 12 and 13 from a common feeder conduit 14. Suitable admission valves (not shown) may be provided for the throttling of the individual turbines as desired. In the common feeder conduit is provided an emergency control valve 15 shown diagrammatically in this instance as a globe valve, it being understood, however, that any suitable type of valve means is thereby represented. An operating motor 16 for the valve 15 is shown as comprising a cylinder 17 having a piston 18 slidably mounted therein. The stem 19 secured to the piston is connected to the valve 15 for controlling the position thereof. Operating fluid for the motor is supplied through a pilot valve 20 which comprises a cylinder 21 having valve heads 22 and 23 provided upon a stem 24 slidably arranged therein. In the well known manner, the chambers above and below the piston 18 of the operating motor 16 communicate with the pilot valve through conduits 25 and 26 respectively. Operating fluid is adapted to be supplied to the pilot valve cylinder through a connection 27 and to be exhausted therefrom through connections 28 and 29.

The turbines 10 and 11 of the power plant are provided with similar speed responsive governor devices shown in this instance as being of the shaft embedded type mounted within bores 30 and 31 of the turbine shafts 32 and 33 respectively. The governor devices each comprise a plunger or fly weight 34 biased toward the center of the shaft by means of a compression spring 35 surrounding the fly weight 34 and bearing against the disk 36 and the plug 37. During normal operation the fly weights 34 are biased inwardly against the centrifugal force acting thereon. As the speed of either shaft rises beyond a predetermined value, the centrifugal force overcomes the biasing force of the compression spring and permits radially outward movement of the fly weight.

Tripping devices 38 and 39 are provided for the turbines 10 and 11 respectively mounted adjacent the governor devices and adapted to be released as the governor fly weights are forced outwardly to effect the actuation of the emergency control valve 15. Certain elements of the tripping devices are substantially alike and will be described but once, like elements being given the same reference characters in the drawing. The tripping devices include a trigger 40 pivotally mounted to a stationary part as at 41, the trigger having a finger 42 depending downwardly adjacent the turbine shaft which is adapted to be engaged by the fly weight 34 as it is thrown outwardly. An actuating plunger 43 is slidably mounted within a bore provided in a stationary frame member 44 and is biased downwardly by means of a compression spring 45 arranged between a collar 46 secured to the plunger 43 and the lower surface of the frame member 44. In the restrained position of the plunger, the lower end thereof is adapted to seat upon a shoulder 47 formed on the trigger 40. A stop 48 is provided on the trigger 40 for determining the seating area on the shoulder 47 and hence the amount of movement of the trigger required for releasing the plunger. As the trigger is rotated in a counter-clockwise direction upon the outward movement of the fly weight 34, the lower end of the plunger 43 is unseated from the shoulder and, due to the spring 45, is moved downwardly, the downward movement being arrested by a stop 49 positioned to engage a shoulder 50 provided on the plunger. An operating lever 51 is pivotally supported as at 52 upon a stationary part 53 extending from the frame member 44. An arm of the lever 51 is provided with a knuckle 54 which is positioned between collars 55 and 56 secured to the upper end of the operating plunger 43. The other end of the lever 51 is provided with a handle 57 by means of which the tripping device may be reset.

The trigger 40 is also adapted for manual tripping by means of a lever 58 pivoted as at 59 to a stationary part 60 depending from the frame member 44. The end 61 of the manual trip lever is adapted to engage a pin 62 slidably supported in a bore through a stationary part 63. The other end of the pin 62 is adapted to engage a finger 64 extending from the trigger 40. The pin 62 is normally held in a retracted position by means of a compression spring 65 arranged between a collar 66 and the stationary part 63. By this arrangement, the station attendant upon observing an abnormal condition or for any other reason may effect a shut-down of the power plant by merely raising the left end of the lever 58. This movement being transmitted through the pin 62, will cause a counter-clockwise rotation of the trigger 40 to release the actuating plunger 43.

The operating lever 51 of the tripping device associated with the first turbine 10 is connected by a link 68 to the pilot valve stem 24. Thus, upon the tripping of the trigger 40 of that device either by the governor fly weight 34 or by the manual trip lever 58, the operating lever 51 will be moved in a clockwise direction to move the pilot valve heads to the right causing operating fluid to be supplied through conduit 25 to the upper chamber of the valve operating motor 16. The operating fluid will be expelled from the lower chamber of the motor 14 through conduit 26 whereby the control valve 15 will be actuated to the closed position.

The tripping devices associated with the other turbines such as 11 are arranged for tripping the device associated with the first turbine upon an abnormal condition of speed obtaining with respect to such other turbines. As shown, a pressure responsive element is provided on the frame 44 of the tripping device associated with the first turbine. This pressure responsive device includes an expansible bellows member 69 forming a fluid tight chamber 70 between it and the surrounding casing 71 which is secured upon the frame 44 as by screws 72. An operating stem 73 secured to the movable end wall 74 of the bellows device extends through a bore in the frame member 42 and is connected to the manual trip lever 58 as at 75. The bellows member 69 and hence the stem 73 is normally biased to an upward position by means of a spring 76 mounted within the bellows around the stem 73 and in engagement with the end wall 74 and the frame 44. The bellows is restrained in a compressed condition by means of compressed fluid supplied to the chamber 70 by means of a conduit 77.

The fluid pressure in the conduit 77 and hence in the chamber 70 is controlled by a valve means 78 associated with the tripping device of the turbine 11. As shown, this valve includes a cylinder 79 having a pair of valve heads 80 and 81 slidably arranged therein upon a stem 82. The valve heads are normally biased to an upper position by means of a spring 83 arranged between the lower valve head 81 and the end wall of the cylinder 79. With the valve heads in the upper position communication is established between a supply connection 84 and the conduit 77 and when the valve heads are moved to a lower position, the supply port is shut off while communication is established between the conduit 77 and the drain connection 85. The valve stem 82 is adapted to be engaged by an arm of a bell crank 86, the other arm of which is connected as by a link 87 to the operating lever 51 of the tripping device 39. The bell crank 86 is pivotally supported as at 88 to a stationary part 89 extending from the frame member 44.

The operation of the arrangement is as follows: Assuming that the tripping devices 38 and 39 are in the set position as shown, the valve heads of the pilot valve 20 are so positioned that operating fluid is supplied therethrough and through conduit 26 to the lower chamber of the valve operating motor 16. The control valve 15 is thus retained in its opened position. The pressure responsive element of the tripping device associated with the first turbine 10 is restrained, that is, the bellows 69 and the spring 76 are compressed due to the pressure of the operating fluid supplied to the chamber 70 through conduit 77, the valve 78 and supply connection 84. Should the speed of the turbine 11 rise above a predetermined value, the fly weight 34 would be thrown upwardly moving the trigger 40 in a counter-clockwise direction releasing the actuating plunger 43. The operating lever 51 associated therewith would be actuated so as to move the bell crank in a clockwise direction to force the stem 82 of the control valve 78 downwardly and to establish communication between the conduit 77 and the drain connection 85. Due to the force of the spring 76, the bellows 69 of the pressure responsive element associated with the tripping device 38 would move upwardly forcing fluid from the chamber 70. The pin 73 would accordingly rotate the trip lever 58 in a clockwise direction to depress the pin 62 and consequently rotate the trigger 40 in a counter-clockwise direction to release the actuating plunger 43 and thereby cause movement of the valve heads of the pilot valve 20 to the right. As previously explained, this adjustment of the pilot valve heads causes the closing of the control valve 15 and the shutting down of the turbines 10 and 11. To reset the system it is necessary first to move manually the lever 51 of the tripping device 39 in a counter-clockwise direction to raise the plunger 43. As the lower end of this plunger clears the shoulder 47, the trigger 40 automatically rotates slightly in the clockwise direction due to the force of gravity acting upon the depending finger 42. The plunger 43 is then rested upon the shoulder 47 and is set for the next releasing operation. It will be noted that as the lever 51 was rotated in the counter-clockwise direction the bell crank 86 was correspondingly moved. The valve heads 80 and 81 of the valve 78 were simultaneously forced upwardly by means of the spring 83 whereupon communication was established between the fluid supply connection 84 and the conduit 77. Upon the resulting compression of the bellows of the pressure element associated with the tripping device 38, that device may subsequently be reset in a manner similar to that described in connection with the tripping device 39. It will be noted that as the operating lever 51 of the tripping device 38 is operated to reset that device, the valve heads of the pilot valve 29 are so actuated as to cause the opening of the control valve 15.

While I have described the system as adapted for controlling a power plant of only two turbines, it is obvious that substantially the same arrangement can be used for controlling a greater number of turbines similarly arranged. This can be done by merely providing the additional turbines with tripping devices similar to that used in conjunction with the turbine 11. Such devices would embody valves similar to 78 for controlling the fluid pressure in the conduit 77 extending to the pressure element of the tripping device 38 associated with the first turbine. The arrangement shown is extremely simple in design and reliable in operation. Due to the fact that most of the structural parts of the tripping devices 38 and 39 are alike, such parts may be interchanged as desired, and the matter of assembly, adjustment and replacement of parts of the respective devices is accordingly simplified.

Having described the method of operation of my invention together with the apparatus which I now consider to represent the best embodiment thereof, I desire to have it understood that the apparatus shown is only illustraive and that the invention may be carried out by other means.

What I claim as new and desire to secure by Letters Patent of the United States is:

1. An emergency control apparatus for fluid systems comprising a plurality of tripping devices each including a condition responsive means, a trigger adapted for actuation by said condition responsive means, a manually operable trip lever for actuating said trigger, and a spring biased actuating means adapted to be released upon actuation of said trigger, an emergency control lever actuable by the spring biased actuating means of one of said plurality of tripping devices, and means responsive to the actuation of the trigger of the other of said tripping devices for actuating the trigger of said one device, said last mentioned means adapted to preclude resetting of said emergency control lever until the other tripping devices have been reset.

2. A fluid control system comprising a plurality of emergency tripping devices, each of said devices including means responsive to a predetermined condition, a trigger adapted to be actuated by said condition responsive means, a manually operable trip lever for said trigger, and spring biased actuating means adapted to be released upon the tripping of said trigger, pressure responsive means associated with the first of said devices for tripping the trigger thereof, valves for controlling said pressure responsive means operable by the other of said plurality of tripping devices, an emergency control lever adapted to be actuated upon the release of the spring biased actuating means of said first device, said control lever being manually operable for resetting said first device.

3. A fluid control system comprising a plurality of emergency tripping devices, each of said devices including means responsive to a predetermined condition, a trigger adapted to be actuated by said condition responsive means, a manually operable trip lever for said trigger, and a spring biased actuating means adapted to be released upon actuation of said trigger, pressure responsive means for actuating the trip lever of the first of said tripping devices, control means for said pressure responsive means associated with the second of said tripping devices and a control lever associated with the first of said tripping devices and adapted to be actuated upon the tripping of either of said devices.

4. Fluid control apparatus comprising a pair of tripping devices each including a condition responsive means, a trigger adapted for actuation by said condition responsive means, a manually operable trip lever for actuating said trigger, and a spring biased actuating means adapted to be released upon actuation of said trigger, the first of said tripping devices having a pressure responsive means for actuating said trip lever, control means for said pressure responsive means operable by the spring biased actuating means of the second of said devices, an emergency control lever operable by the spring biased actuating means of said first device upon the tripping of the trigger of said first tripping device.

PAUL H. KNOWLTON.